(12) United States Patent
Nice et al.

(10) Patent No.: US 9,336,546 B2
(45) Date of Patent: May 10, 2016

(54) RECOMMENDATION SYSTEM WITH MULTI-DIMENSIONAL DISCOVERY EXPERIENCE

(71) Applicant: Microsoft Corporation, Redmond, WA (US)

(72) Inventors: Nir Nice, Kfar Veradim (IL); Noam Koenigstein, Raanana (IL); Ulrich Paquet, Cambridge (GB); Shahar Keren, Hemed (IL); Daniel Sitton, Tel Aviv (IL); Amit Perelstein, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 14/227,002

(22) Filed: Mar. 27, 2014

(65) Prior Publication Data

US 2015/0278908 A1 Oct. 1, 2015

(51) Int. Cl.
*G06F 17/30* (2006.01)
*G06Q 30/06* (2012.01)
*G06Q 30/02* (2012.01)

(52) U.S. Cl.
CPC ............ *G06Q 30/0631* (2013.01); *G06Q 30/02* (2013.01)

(58) Field of Classification Search
USPC ................................................. 707/748, 754
See application file for complete search history.

(56) References Cited

U.S. PATENT DOCUMENTS

| | | | |
|---|---|---|---|
| 7,152,031 B1 * | 12/2006 | Jensen | G06F 17/2785 704/1 |
| 7,222,126 B2 * | 5/2007 | Wolman | G06K 9/6251 707/748 |
| 7,882,111 B2 | 2/2011 | Chien et al. | |
| 8,296,660 B2 | 10/2012 | Macadaan et al. | |
| 9,147,012 B2 * | 9/2015 | Gaude | G06F 17/30867 |

(Continued)

FOREIGN PATENT DOCUMENTS

WO 2013116816 A1 8/2013

OTHER PUBLICATIONS

"International Search Report and Written Opinion Issued in PCT Application No. PCT/US2015/022103", Mailed Date: Jun. 15, 2015, 8 Pages.

(Continued)

*Primary Examiner* — Cam-Linh Nguyen
(74) *Attorney, Agent, or Firm* — Aaron Chatterjee; Judy Yee; Micky Minhas

(57) ABSTRACT

Example apparatus and methods perform matrix factorization (MF) on a collaborative filter based usage matrix to create a multi-dimensional latent space that embeds users, items, and features. A full distance matrix is extracted from the latent space. The full distance matrix may be extracted from the latent space by defining a distance metric between item pairs based on the multi-dimensional representation in the latent space. The full distance matrix may be populated with values computed for item pairs using the distance metric. A plurality of vectors associated with a multi-dimensional Euclidean space are produced from the full distance matrix. The plurality of vectors produce a navigable data set. The plurality of vectors may be produced in a manner that minimizes strain on the distances vectors. A representation of the navigable data set may be presented as, for example, a virtually traversable landscape that supports an interactive user experience.

26 Claims, 10 Drawing Sheets

(56) References Cited

U.S. PATENT DOCUMENTS

| | | | |
|---|---|---|---|
| 9,183,510 B1* | 11/2015 | Walti | G06N 99/005 |
| 2005/0076093 A1 | 4/2005 | Michelitsch et al. | |
| 2006/0200432 A1 | 9/2006 | Flinn et al. | |
| 2007/0106491 A1* | 5/2007 | Carter | G06F 17/277 |
| | | | 704/4 |
| 2007/0106651 A1* | 5/2007 | Isaacson | G06K 9/627 |
| 2009/0265404 A1* | 10/2009 | Tzeng | G06F 17/16 |
| | | | 708/208 |
| 2010/0287033 A1 | 11/2010 | Mathur | |
| 2010/0318427 A1* | 12/2010 | Miranda | G06F 17/30867 |
| | | | 705/14.66 |
| 2014/0121985 A1* | 5/2014 | Sayood | G06F 19/24 |
| | | | 702/19 |
| 2015/0153476 A1* | 6/2015 | Prange | E21B 43/00 |
| | | | 703/2 |

OTHER PUBLICATIONS

Melville, et al., "Content-Boosted Collaborative Filtering for Improved Recommendations", In Proceedings of the Eighteenth National Conference on Artificial Intelligence, Jul. 28, 2002, pp. 187-192.

Koren, et al., "Matrix Factorization Techniques for Recommender Systems", In IEEE Computer Society, vol. 42, Issue No. 8, Aug. 1, 2009, pp. 30-37.

Bostandjiev, et al., "TasteWeights: A Visual Interactive Hybrid Recommender System", In Proceedings of 6th ACM Conference on Recommender Systems, Sep. 9, 2012, 8 pages.

Schafer, J. Ben, "DynamicLens: A Dynamic User-Interface for a Meta-Recommendation System", In Proceedings of International Conference on Intelligent User Interfaces, Jan. 9, 2005, 5 pages.

* cited by examiner

RECOMMENDATION SYSTEM WITH MULTI-DIMENSIONAL DISCOVERY EXPERIENCE

BACKGROUND

Conventional recommendation systems provide a powerful discovery experience by suggesting items to users that the users have consumed in the past. Recommendation systems provide information about matches between users (e.g., shoppers) and items (e.g., books, videos, games) based on user interests, preferences, history, or other factors. For example, if a system has data that a user has previously accessed (e.g., purchased, rented, borrowed, played) a set of items, then a recommendation system may identify similar items and recommend them to the user based on the data about the user's own actions (e.g., "if you liked this, you might like that"). While a conventional system may produce interesting recommendations, those recommendations may be provided in a passive experience where the system infers what a user is interested in based on the user's past experience and then presents a recommendation.

There are two major types of conventional recommendation systems: collaborative filtering based systems, and feature based systems. Both types of systems have their advantages and disadvantages. For example, in a matrix factorization over collaborative filtering approach, the recommendation may be based on a user's history. However, the user's history may be unrelated to their current interest. For example, a grandfather may spend the bulk of his shopping time looking for fly fishing material, for historical fiction set in the American Midwest, and for travel movies. A recommendation system may zero in on the grandfather's likes and dislikes based on that shopping history. However, when the grandfather is shopping for a birthday gift for his youngest granddaughter, the fly-fishing, historical fiction, and travel movie history may be irrelevant to his current intent. A user's current intent or short term interest may be completely unrelated to the inferred intent based on their history. In a feature based system, the discovery experience allows users to explore items that share common features (e.g., genre, director, plot). Some feature based systems allow users to "drill into" a feature to find other items that have the same feature (e.g., same director in same genre). However, feature based systems tend to be shallow and may produce recommendations that are unsophisticated. The recommendations may miss out on interesting connections and may produce recommendations based on connections that are so trivial as to be unreal. Additionally, feature based systems may completely ignore actual behavior, either long-term tendencies or short-term interests. While feature based systems may provide some good recommendations, the data upon which the recommendations are made may need to be manually created, which may be time-consuming and expensive.

Collaborative filtering depends on actual user events (e.g., user who bought/watched/read an item). Matrix factorization over collaborative filters is regarded as providing superior results for a recommendation system. Matrix factorization over collaborative filters may embed an item model and a user model in a single latent space and then determine similarity based on actual usage. For example, conventional matrix factorization models map users and items to a joint latent factor space and model user-item interactions as inner products in the joint latent factor space. An item may be associated with an item vector whose elements measure the extent to which the item possesses some factors. Similarly, a user may be associated with a user vector whose elements measure the extent of interest the user has in items that are high in corresponding factors. The dot product of the vectors may describe the interaction between the user and item and may be used to determine whether to make a recommendation to a user. More specifically, every user i may be assigned a vector $u_i$ in a latent space, and every item j may also be assigned a vector $v_j$ in the latent space, i and j being integers. The dot product $u_i \cdot v_j$ represents the score between the user i and the item j. The score represents the strength of the relationship between the user i and the item j and may be used to make a recommendation (e.g., recommend item with highest score). The recommendation may simply appear in a passive system and the viewer can select or not select the item. The grandfather searching for a present for his youngest granddaughter may only know one keyword "e.g., ponies" that is relevant to the granddaughter and may not have any information about the brand names or characters associated with the virtual pony game the granddaughter plays. The grandfather may want to "look around" at items in the virtual pony space, rather than simply rely on a single recommendation that shows a pony in a fly-fishing environment in a historical setting in the Midwest.

In a conventional matrix factorization over collaborative filter system, after all the items have been scored, the highest scoring items may be selected and recommended. This may be represented as: given i, find j=arg max $u_i \cdot v_j$. In mathematics, arg max is the argument of the maximum, which is defined as the set of points of the given argument for which the given function attains its maximum value.

$$\underset{x}{\operatorname{argmax}} f(x) := \{x \mid \forall y : f(y) \le f(x)\}$$

In other words, arg $\max_x$ f (x) is the set of values of x for which f(x) attains its largest value M. For example, if f(x) is $1-|x|$ then it attains its maximum value of 1 at x=0 and only there, so arg $\max_x (1-|x|)=\{0\}$. Once again, the recommendation may simply be provided in a passive display. The grandfather may be unsure whether the recommended item is appropriate for his granddaughter, and may be unaware of other products that may be relevant. The passive system may provide no opportunity for the grandfather to seek assistance from either product specialists or other similarly situated shoppers who may have more knowledge about virtual ponies for five year old girls.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods perform matrix factorization over collaborative filters to produce data from which an interactive recommendation experience can be provided. Rather than simply provide a recommendation (e.g., "if you liked this, you might like this"), example apparatus and methods present a navigable landscape that a user may traverse to actively explore other options. This recommendation may be viewed as having the form "if you liked this, why don't you consider looking around in this area for other things you might like." Thus, the active recommendation system may behave like a transporter and global positioning system for shopping. In one embodiment, a user may begin their shopping experience by identifying a general class of items they wish to view (e.g., sporting goods), by identifying a more specific class of items they wish to view (e.g., fly-fishing equipment) or even by identifying a specific item (e.g., GR30 Fly Rod). A user's navigation in the navigable space may indicate short term intent and current interest, which may then be used to control the shopping landscape presented to the user. Using the interactive landscape model, the grandfather may be exposed to other shoppers or other shoppers may be exposed to the grandfather, which may produce a social experience where shoppers can interact. The interacting shoppers may be able to provide each other with tips about where to look, with real-time reviews or commentary on purchases that people are considering, or other information shoppers who share a current short term interest may share. The interactive landscape model that includes social interaction may also facilitate, for example, a matchmaking experience where people who share a current short term interest may meet. For example, shoppers who are looking for similar fly fishing gear and who are looking for maps for a similar region may be introduced since they may be considering a fly-fishing trip to the same location. The interactive landscape model may also provide opportunities for advertisers to locate information in relevant spaces. For example, cabins for rent in the location associated with the maps being perused by the fly-fishermen may be presented. Similarly, hip waders or vests may be located in the fly-fishing landscape. Short term interest as expressed by navigating toward or away from certain advertisements may then be used to position other potentially more relevant advertising.

In one example, an apparatus may produce an item space in which items that are near to each other are similar based on true usage (e.g., actual purchases, actual play time) and/or on features. The apparatus may produce a navigable landscape where users may actively explore items. Exploring for items may express current (e.g., short term) interests. User intent or interest may be inferred from the location on the landscape and the direction(s) in which the user navigates. Position in the navigable landscape may provide opportunities to discover or interact with other shoppers in the same neighborhood in the landscape. Since the navigable landscape provides a model of a pseudo-physical space that can be traversed (e.g., walked), where a user may appear to move around in the displayed space, advertisers may position targeted ads that are relevant to that space. Shoppers may then choose to explore targeted ads based on their current interest.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods provide a recommendation system that produces a navigable data set for which a virtually traversable landscape may be presented. In one embodiment, a shopper may be presented with a virtual store or virtual bazaar where items of potential interest are displayed. As the user navigates (e.g., walks) towards some items or picks up some item the user's current intent may be inferred and items of interest may be relocated on the landscape to be closer or further away from the user. As the user navigates, the user may be presented with an opportunity to interact with other shoppers who are looking at similar things. The user may then interact (e.g., chat, text, email, video conference) with other similarly situated shoppers. Advertisers may be provided an opportunity to place ads at strategic locations on the landscape. The advertisements may be targeted based on their similarity to items at which the shopper is looking.

Figure 1:
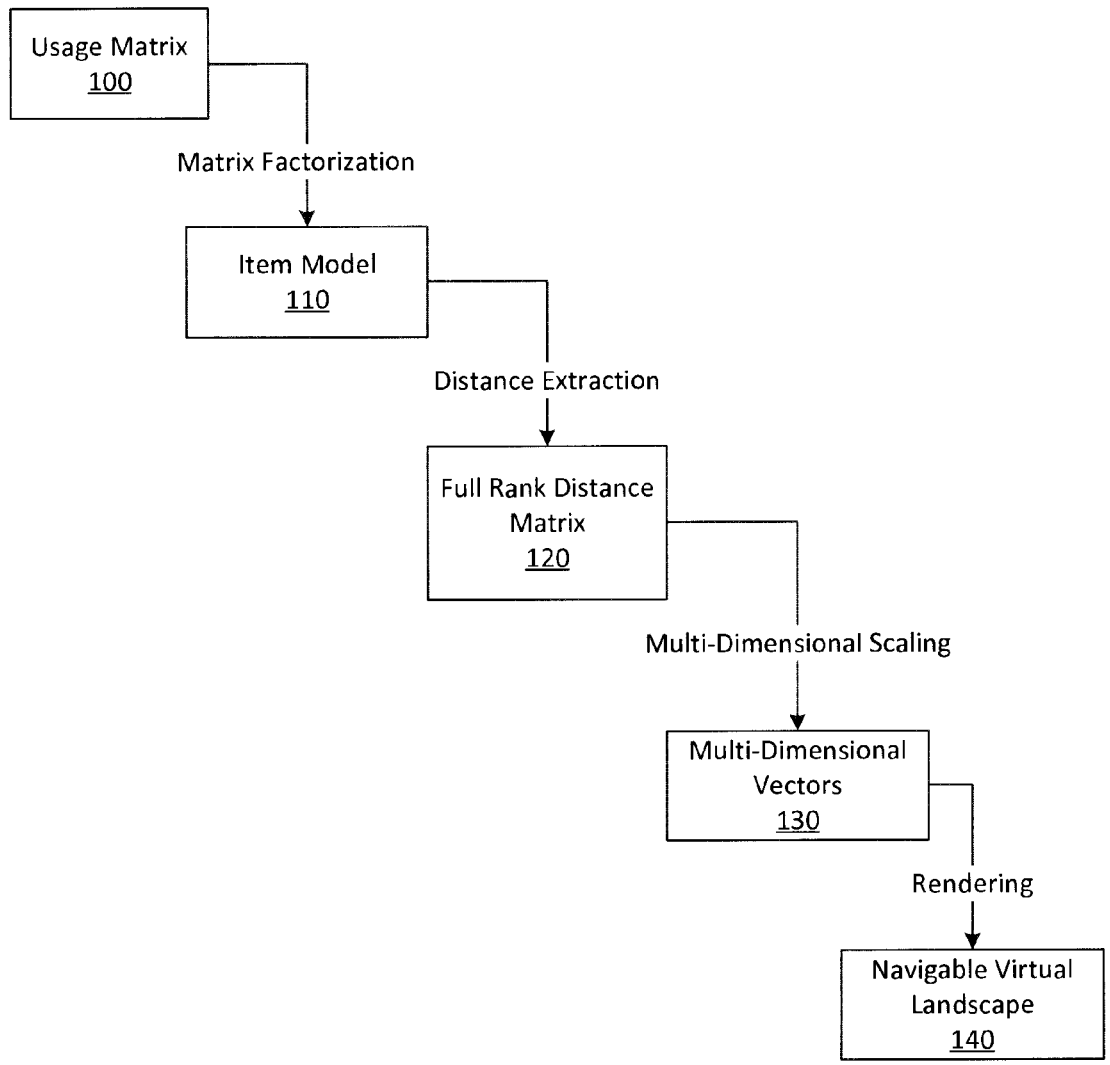
FIG. 1 illustrates example distance matrix extraction and multi-dimensional scaling.

FIG. 1 illustrates example distance matrix extraction and multi-dimensional scaling. Matrix factorization is performed on a usage matrix 100 to produce an item model 110. A full distance matrix 120 is extracted from the item model 100 using, for example, a distance metric. Multi-dimensional (e.g., 3D) vectors 130 are produced from the distance matrix 120 using, for example, multi-dimensional scaling. A virtual navigable landscape 140 (e.g., store, flea market, bazaar, mall) may be rendered from the multi-dimensional vectors 130.

Matrix factorization is the process by which a sparse usage matrix is converted into a latent item model. Example apparatus and methods may employ a matrix factorization approach that processes a usage matrix having embedded users, items, and features. The latent item model is the product of the matrix factorization. The item model is a latent representation of the items for which data appeared in the usage matrix. In the latent item model, an item is represented by a low dimensional vector. In one embodiment, the low dimensional vector may have twenty dimensions. In the latent item model, vectors belonging to similar items will point in similar directions. The similar directionality between similar items exposes relationships between items and may also reveal clusters of similar items that may then be recommended to a user based on the strength of their like of a similar item.

Figure 2:
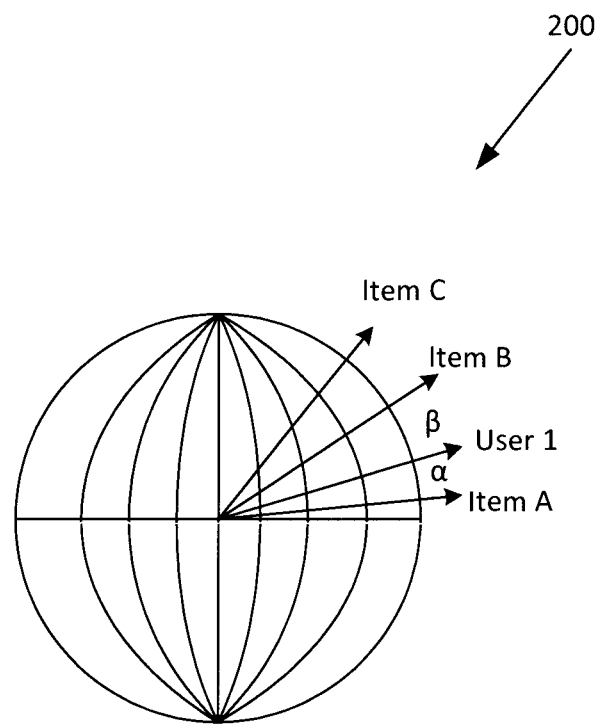
FIG. 2 illustrates an example latent space.

FIG. 2 illustrates a latent space 200 where the distance between items is defined by angles. For example, the distance between a first vector and a second vector may be measured by angle α and the distance between the second vector and a third vector can be measured by β. The distance between items may describe, for example, how similar the items are. The distance between users and items may describe, for example, how likely it is that a user will like an item. While distance is illustrated being measured by angles, other distance measuring approaches may be applied. Conventionally, the latent space 200 may have been created by performing matrix factorization on a user to item matrix and thus the distance between a user item and vector item could be found. Example apparatus and methods facilitate embedding target advertisements so that vectors for advertisements may appear close to vectors for relevant items. The vectors may be manipulated to provide, for example, a two or three-dimensional virtual landscape (e.g., store aisles, flea market, bazaar) through which a user may navigate to find interesting items.

Example apparatus and methods process a collaborative matrix. The collaborative matrix combines users, items, and features. The combined user, items, and features are used to produce a high dimension (e.g., 20 dimension, 50 dimension) latent space. The latent space is produced using matrix factorization with features embedding. Targeted advertisements may be embedded in the high dimension latent space. Targeted advertisements may be placed near a relevant item, near a relevant feature, near a popular item, near a popular feature, or in other ways.

The high dimension space may then be reduced to a smaller number of dimensions (e.g., 3 dimensions). Reducing the high dimension latent space to three dimensions may include extracting a full distance matrix and then performing multi-dimensional scaling (MDS). Extracting the full distance matrix may involve defining a distance metric between item pairs based on their higher (e.g., K) dimensional representation in the high dimension latent space. The output of the full distance matrix extraction is an N-by-N distance matrix, where N is the number of items in the matrix. The N×N distance matrix may then be input to the MDS processor. The MDS processor inputs the N×N distance matrix and outputs data associated with a multi-dimensional Euclidian space. While reducing a higher dimension space to a lower dimension space has been described, in one embodiment, matrix factorization may be performed directly to a desired dimensionality (e.g., 3). When matrix factorization to a desired dimensionality is performed, it may be possible to skip the MDS.

In one embodiment, the full rank item similarities (distances) may be extracted from the high dimension latent space using a cosine similarity (e.g., spherical angle) approach. In one embodiment, using the cosine similarity may include computing the distance dis between an item i and an item j according to:

$$dis(i, j) = \text{angle}(i, j) = \cos^{-1}\left(\frac{v_i^T v_j}{\|v_i\| \|v_j\|}\right)$$

where $v_i$ is a vector representing item i in the latent space, and $v_j$ is a vector representing item j in the latent space. The output of the extraction stage is an N×N similarity matrix D that may be described by:

$$D = \begin{pmatrix} dis(1,1) & \cdots & dis(1,N) \\ \vdots & \ddots & \vdots \\ dis(N,1) & \cdots & dis(N,N) \end{pmatrix}$$

Matrix D is then input into the MDS processor, which outputs a low dimensional embedding. While the spherical angle approach using cosine similarity has been described, other distance metrics may be employed. For example, the one minus cosine similarity metric (e.g., dis(i,j)=1−cos(angle (i, j))) may be employed.

While reducing a higher dimension space to a lower dimension space using MDS is described, in one embodiment, matrix factorization may be performed directly to a desired dimensionality (e.g., 3). When matrix factorization to a desired dimensionality is performed, it may be possible to skip the MDS. When MDS is performed, MDS begins with the N×N similarity matrix D and produces a 3D embedding for items in the matrix. In one embodiment, the 3D embedding will preserve the distances in the original matrix for all items represented in the original matrix. MDS will, for an item pair i and j, learn 3-D vectors $x_i$ and $x_j$ so that the strain on the distances will be minimized. In one embodiment, the strain may be measured by squared loss. In one embodiment, minimizing the squared loss may be represented by:

$$\min_{x_1, x_2 \cdots x_N} (d_{ij} - \|x_i - x_j\|)^2,$$

where $d_{ij}$ is the (i,j)'th entry in the distance matrix D.

In one embodiment, minimizing the squared loss, or, more generally, minimizing the strain, may be achieved by defining a matrix A with components $$a_{ij} = -\frac{1}{2} d_{i,j}^2,$$

where $d_{i,j}^2$ is the squared distance between item i and item j. Once A has been defined, A may be centered using a centering matrix $$H = I - \frac{1}{n} 1$$

to produce B=HAH. B may then be decomposed using: $B = V\Lambda V^T$, where V are the eigenvectors and Λ is a diagonal eigenvalues matrix. New coordinates in the lower dimensional (e.g., 2D, 3D) space may then be given by a matrix X as follows:

$$X = V\Lambda^{\frac{1}{2}}.$$

In one embodiment, the first three components of vectors in X may then be used to produce a 3D navigable landscape. In another embodiment, the first two components in X may be used to produce a 2D navigable landscape.

Once the vectors that support producing the navigable landscape are available, the landscape may then be presented to users using a 3D graphic presentation (e.g., XNA, DirectX). The navigable landscape may allow a user to travel through a virtual item space looking for a specific item or feature. As the user travels through the virtual item space, they may encounter targeted advertisements. The user may also encounter other shoppers who are expressing the same current interest by navigating to similar locations in the virtual item space. The user may choose to interact with these other shoppers. In one embodiment, the 3D graphical presentation may present a volume (e.g., globe, sphere, ball). In another embodiment, the 3D graphical presentation may present a surface of a volume.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, distributions, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, system-on-a-chip (SoC), or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
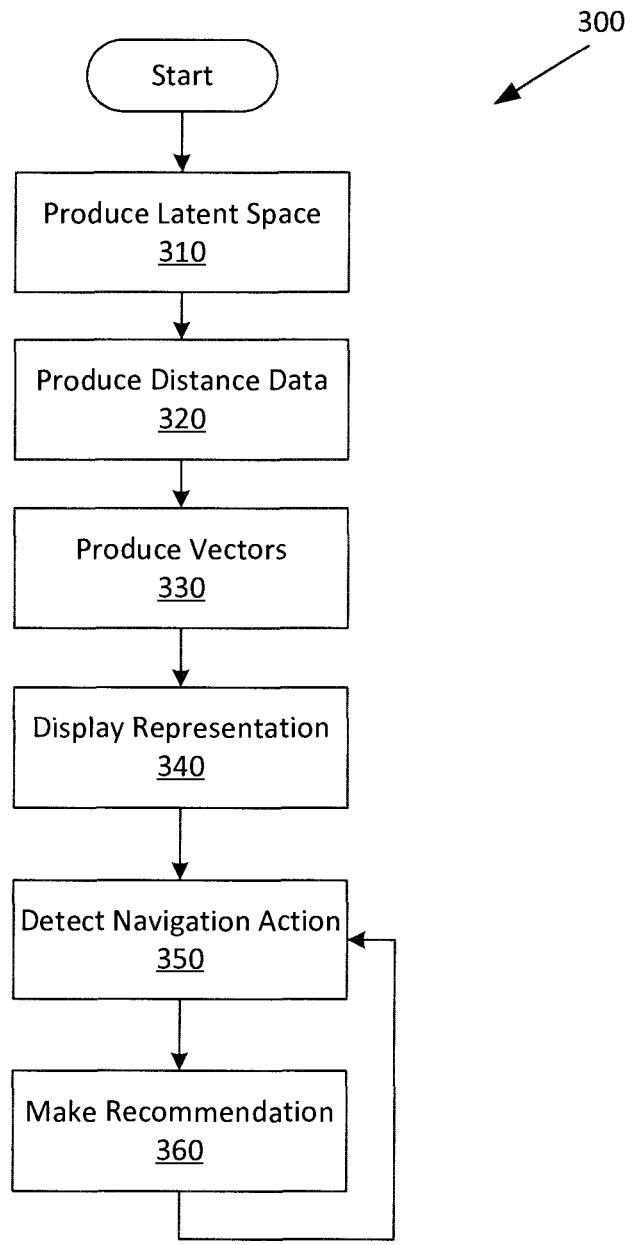
FIG. 3 illustrates an example method associated with providing a recommendation system with a multi-dimensional discovery experience.

FIG. 3 illustrates an example method 300 associated with providing a recommendation system with a multi-dimensional discovery experience. Method 300 may include, at 310, producing a first electronic data set associated with a multi-dimensional latent space that embeds items, users, and features. The latent space may be produced by performing matrix factorization on collaborative filter data. In one embodiment, producing the latent space may include placing a viewable advertisement in the latent space. Placing the advertisement in the latent space may include, for example, storing a vector associated with the advertisement in the latent space. The advertisement may be placed at a location determined by a relationship between the advertisement and an item embedded in the latent space.

Figure 9:
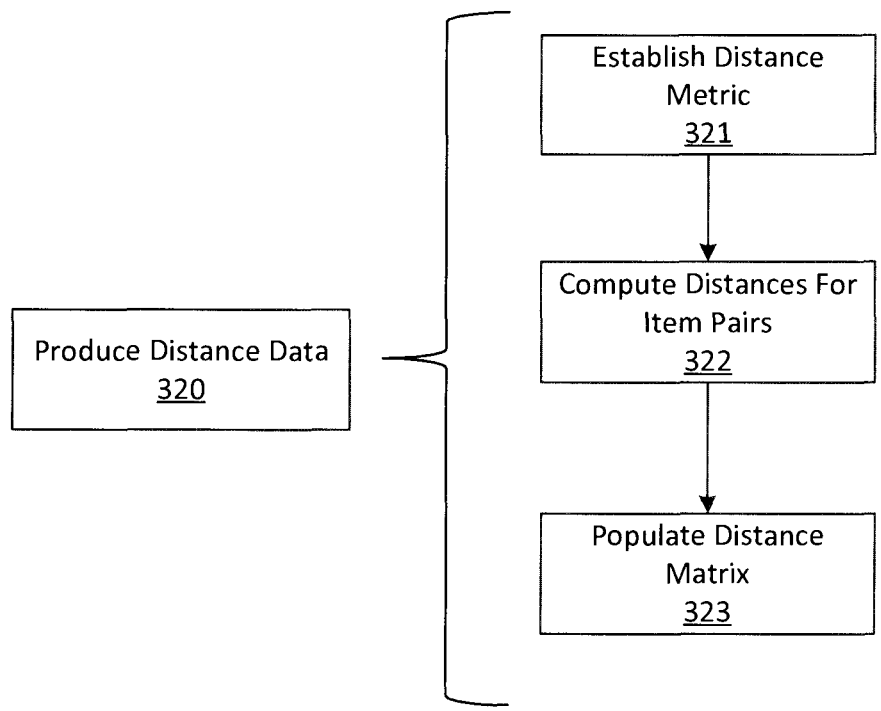
FIG. 9 illustrates additional detail for a portion of an example method.

Method 300 may also include, at 320, producing a second electronic data set from the first electronic data set. The second electronic data set stores distances between pairs of items represented in the latent space. In one embodiment, producing the second electronic data includes extracting a full distance matrix D from the multi-dimensional latent space by defining a distance metric between item pairs in the latent space and then populating the full distance matrix with values computed using the distance metric. FIG. 9 provides additional detail about action 320.

Figure 10:
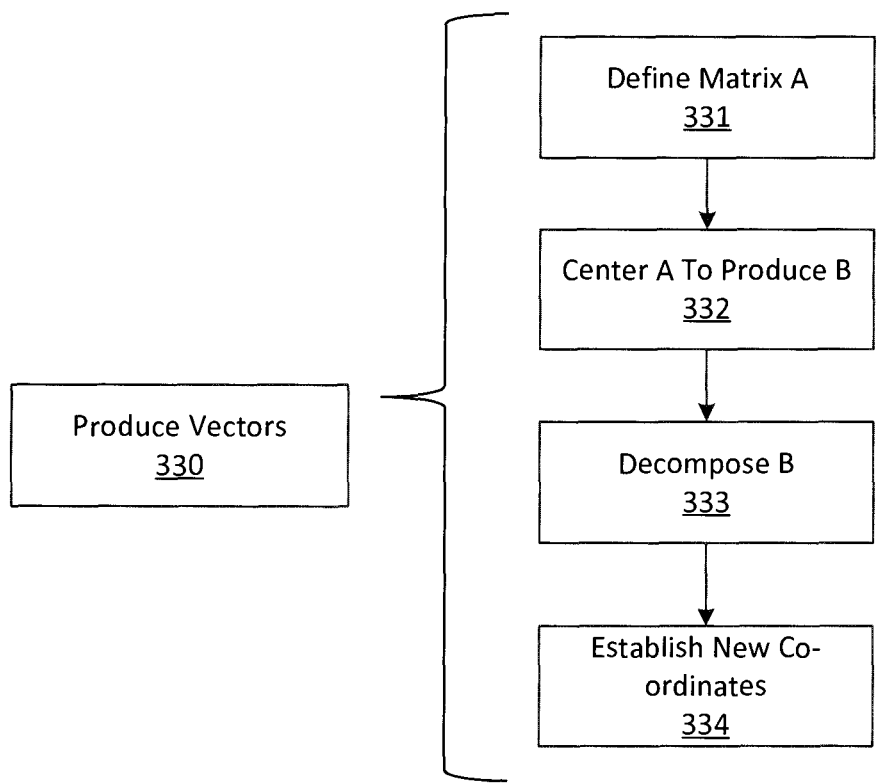
FIG. 10 illustrates additional detail for a portion of an example method.

Method 300 may also include, at 330, producing a third electronic data set from the second electronic data set. The third electronic data set stores data associated with vectors that represent items for which distances are stored in the second electronic data set. In one embodiment, producing the third electronic data at 330 includes minimizing the strain on the distances between vectors. Minimizing the strain may include minimizing squared loss as represented by:

$$\min_{x_1, x_2 \ldots x_N} (d_{ij} - \|x_i - x_j\|)^2,$$

where $d_{ij}$ is the (i,j)'th entry in the distance matrix D. FIG. 10 provides additional detail for minimizing the strain.

Method 300 may also include, at 340, displaying a multi-dimensional visual representation of an item landscape. The multi-dimensional visual representation may be rendered from the multi-dimensional vectors onto a computer display. In different embodiments the representation may be a surface (e.g., two dimensional), may be a volume (e.g., three dimensional), or may take other forms. Items may be positioned on or in the item landscape based, at least in part, on the vectors. For example, a subset of the elements of a vector may be used to determine the location of an item associated with the vector.

Method 300 may also include, at 350, detecting a navigation action from a viewer of the multi-dimensional visual representation. The navigation action may be, for example, a user taking a virtual step in a virtual direction, a user virtually reaching towards a virtual item, a user touching or otherwise selecting an item, a user virtually looking in a certain direction, or other action. In one embodiment, the navigation action may be an initial action where a user may begin their shopping experience by identifying a general class of items they wish to view (e.g., sporting goods), by identifying a more specific class of items they wish to view (e.g., fly-fishing equipment) or even by identifying a specific item (e.g., GR30 Fly Rod). The initial action may facilitate placing the user at an initial location in the multi-dimensional visual representation.

Method 300 may also include, at 360, making a recommendation of an item to the viewer based, at least in part, on the navigation action. The recommendation may take the form of "if you liked this, then you might also like this." However, the recommendation may also take the form of "if you liked this, then why not consider looking over here," where a direction or area on the landscape is highlighted or otherwise identified for the user.

Figure 4:
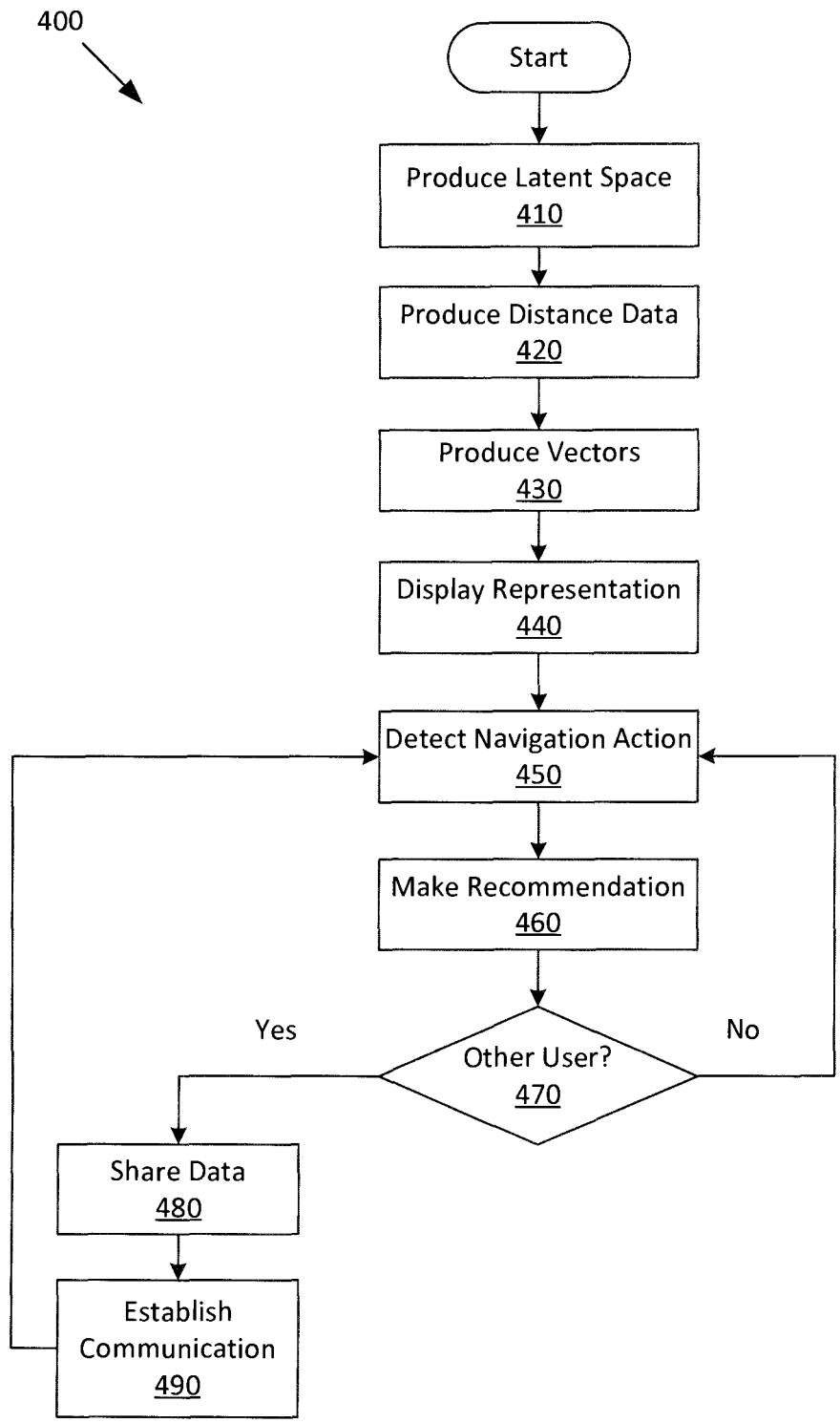
FIG. 4 illustrates an example method associated with providing a recommendation system with a multi-dimensional discovery experience.

FIG. 4 illustrates another example method 400 associated with providing a recommendation system with a multi-dimensional discovery experience. Method 400 may include several actions similar to method 300 (FIG. 3). For example, method 400 may include producing a latent space at 410, producing distance data at 420, producing vectors at 430, displaying a navigable representation of the item space at 440, detecting a user navigation action at 450, and making a recommendation at 460. However, method 400 may include additional actions. For example, method 400 may include, at 470, determining whether there is another user navigating near this user in the navigable representation of the item space. A user may be detected when the proximity of the users is within a threshold distance. The threshold distance may be, for example, an angle between item vectors associated with items being examined, or other measures.

If the determination at 470 is No, that there are no other users within the threshold distance, then method 400 may simply return to 450 to detect the next navigation action. But if the determination at 470 is Yes, that there is another user within the threshold distance, then method 400 may proceed, at 480, to selectively share data between the users. Sharing the data may include, for example, sharing identifying data so that users can decide whether to interact, sharing navigation data so that users can decide whether to follow the path of other users, sharing reviews by the user, or sharing other data. Sharing the data at 480 may include, for example, selectively exposing information concerning the current viewer to the one or more other detected viewers or selectively exposing information concerning the one or more other detected viewers with the current viewer.

Method 400 may also include, at 490, selectively establishing a communication between the viewer and the one or more other viewers. The communication may be, for example, a message, an email, a video conference link, or other electronic communication.

FIG. 9 provides additional detail about action 320 (FIG. 3). Producing the distance data at 320 may include, at 321, establishing a distance metric that will be used to calculate the distance between, for example, item pairs. The distance will be proportional to the similarity between the items. In one embodiment, the distance metric may be the cosine similarity (e.g., spherical angle) measure while in another embodiment the one minus cosine similarity metric may be used. Other distance metrics may be employed. Once a distance metric has been established, distances for item pairs may be computed at 322. In one embodiment, distances for all item pairs may be computed while in another embodiment distances for a sample of item pairs may be computed. Once distances have been computed, then the distance matrix may be populated at 323.

FIG. 10 provides additional detail about action 330 (FIG. 3). Producing the vectors at 330 may include, at 331, defining a matrix A, with components $$a_{i,j} = -\frac{1}{2}d_{i,j}^2,$$

where $d_{i,j}^2$ is the squared distance between item i and item j. Producing the vectors at 330 may also include, at 332, centering A using a centering matrix $$H = I - \frac{1}{n}1$$

to produce B=HAH. Producing the vectors at 330 may also include, at 333, decomposing B using: B=VΛV$^T$, where V are the eigenvectors and Λ is a diagonal eigenvalues matrix, and, at 334, establishing new coordinates in a lower dimensional space using a matrix X according to:

$$X = V\Lambda^{\frac{1}{2}}.$$

While FIGS. 3 and 4 illustrates various actions occurring in serial, it is to be appreciated that various actions illustrated in FIGS. 3 and 4 could occur substantially in parallel. By way of illustration, a first process could produce a data set with embedded users, items, and features, a second process could extract a full distance matrix, a third process could perform multi-dimensional scaling, and a fourth process could provide a navigable landscape upon which a user may travel to examine items, receive recommendations, view targeted advertisements, or interact with other shoppers who have expressed a similar current interest. While four processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the above methods are described as being stored on a computer-readable storage medium, it is to be appreciated that executable instructions associated with other example methods described or claimed herein may also be stored on a computer-readable storage medium. In different embodiments the example methods described herein may be triggered in different ways. In one embodiment, a method may be triggered manually by a user. In another example, a method may be triggered automatically.

"Computer-readable storage medium", as used herein, refers to a medium that stores instructions or data. "Computer-readable storage medium" does not refer to propagated signals, per se. A computer-readable storage medium may take forms, including, but not limited to, non-volatile media, and volatile media. Non-volatile media may include, for example, optical disks, magnetic disks, tapes, flash memory, read only memory (ROM), and other media. Volatile media may include, for example, semiconductor memories, dynamic memory (e.g., dynamic random access memory (DRAM), synchronous dynamic random access memory (SDRAM), double data rate synchronous dynamic random-access memory (DDR SDRAM), etc.), and other media. Common forms of a computer-readable storage medium may include, but are not limited to, a floppy disk, a flexible disk, a hard disk, a magnetic tape, other magnetic medium, a compact disk (CD), a random access memory (RAM), a read only memory (ROM), a memory chip or card, a memory stick, and other media from which a computer, a processor or other electronic device can read.

Figure 5:
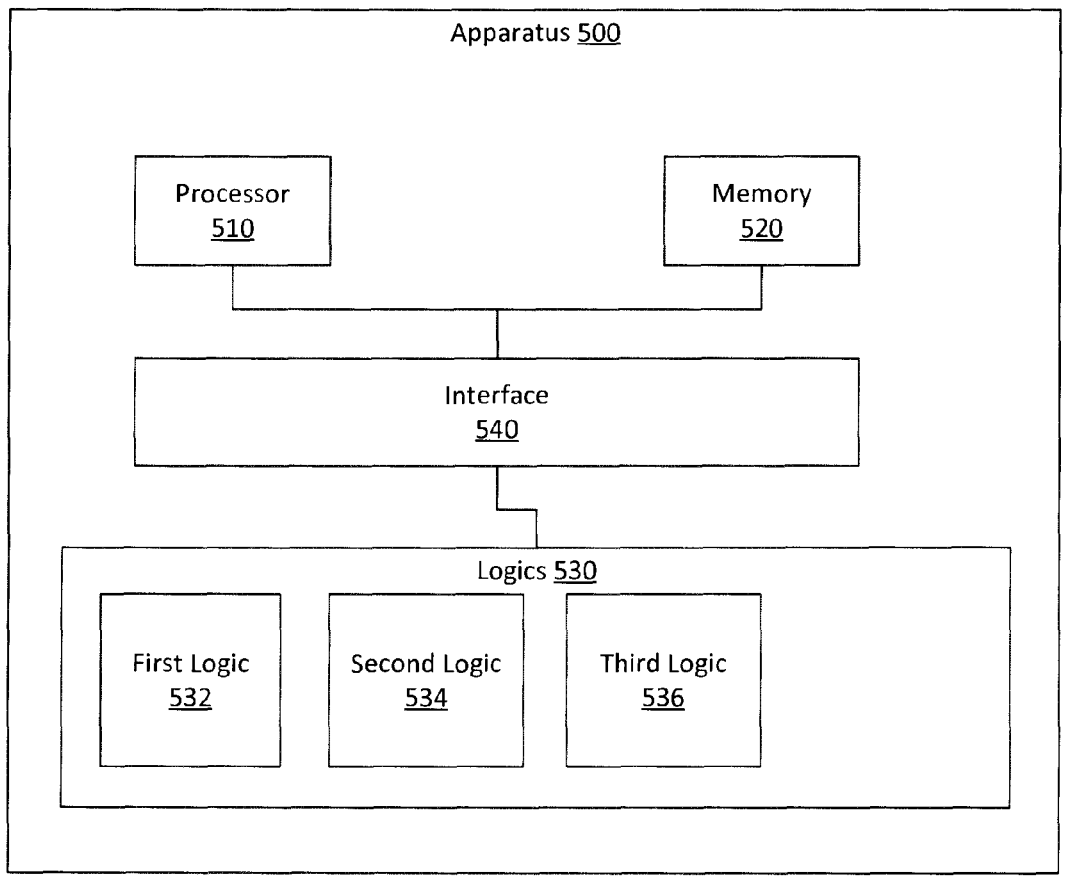
FIG. 5 illustrates an example apparatus associated with providing a recommendation system with a multi-dimensional discovery experience.

FIG. 5 illustrates an apparatus 500 that produces a navigable data set from which a virtual recommendation discovery experience may be provided. Apparatus 500 may include a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a processor in a mobile device, a system-on-a-chip, a dual or quad processor, or other computer hardware. The memory 520 may store data (e.g., vector $m_i$) representing a user i, may store data (e.g., vector $m_j$) representing an item j, may store data relating a user to an item, may store advertisement data, may store related shopper data, or may store other data. Memory 520 may store data associated with making a recommendation based on current intent expressed through navigation actions in a virtual landscape.

In one embodiment, the apparatus 500 may be a general purpose computer that has been transformed into a special purpose computer through the inclusion of the set 530 of logics. Apparatus 500 may interact with other apparatus, processes, and services through, for example, a computer network. Apparatus 500 may be, for example, a computer, a laptop computer, a tablet computer, a personal electronic device, a smart phone, a system-on-a-chip (SoC), or other device that can access and process data.

The set 530 of logics may include a first logic 532 that accesses a Q-dimensional latent space that embeds users and items. Accessing the latent space may include reading data, opening a file, acquiring data from a table or database, or other computerized action. Q may be, for example, at least twenty. The Q-dimensional latent space may embed users, items, and features. Users may be, for example, people who have shopped, borrowed, accessed, or otherwise used the items. The items may be, for example, video games, books, movies, clothing, or other items. In one embodiment, the first logic 532 may create the Q-dimensional latent space by performing matrix factorization on collaborative filtering data. Recall that collaborative filtering data records actual user usage (e.g., purchases, views, accesses).

In one embodiment, the first logic 532 may embed an advertisement in the Q-dimensional latent space. The location of the advertisement may be determined, for example, by proximity to a relevant item, by proximity to a relevant feature, by proximity to a popular item, or by proximity to a popular feature. Embedding the advertisement in the Q-dimensional latent space may include, for example, inserting into the latent space a vector that represents the item to be advertised.

The set 530 of logics may also include a second logic 534 that extracts a full distance matrix from the Q-dimensional latent space. In one embodiment, "full distance" refers to accounting for the differences between all elements of a vector. In one embodiment, the second logic 534 extracts the full distance matrix from the Q-dimensional latent space by defining a distance metric between item pairs in the latent space and then populating the full distance matrix using values computed for item pairs using the distance metric. In one embodiment, the distance metric may be:

$$dis(i, j) = \text{angle}(i, j) = \cos^{-1}\left(\frac{v_i^T v_j}{\|v_i\|\|v_j\|}\right)$$

where $v_i$ is a vector representing item i in the latent space, and $v_j$ is a vector representing item j in the latent space. In another embodiment, the distance metric may be:

$$dis(i,j) = 1 - \cos(\text{angle}(i,j)))$$

where i is an item in the latent space, and j is an item represented in the latent space. The full distance matrix is represented by:

$$D = \begin{pmatrix} dis(1,1) & \cdots & dis(1,N) \\ \vdots & \ddots & \vdots \\ dis(N,1) & \cdots & dis(N,N) \end{pmatrix}$$

N being the number of items in the matrix.

The set 530 of logics may also include a third logic 536 that produces a plurality of vectors associated with a P-dimensional Euclidean space from the full distance matrix. P is less than Q and may be, for example, three. The navigable data set may be based, at least in part, on the plurality of vectors. In one embodiment, the third logic 536 produces the plurality of vectors in a manner that minimizes strain on the distances between members of the plurality of vectors. Minimizing the strain on the distances between members of the plurality of vectors may involve minimizing squared loss as represented by:

$$\min_{x_1, x_2 \cdots x_N} (d_{ij} - \|x_i - x_j\|)^2,$$

where $d_{ij}$ is the (i,j)'th entry in the distance matrix D. An example technique for minimizing squared loss was described above. Once the vectors have been produced, the third logic 536 may produce a member of the plurality of vectors using the first n components of a vector in X, where n may be, for example, three.

Figure 6:
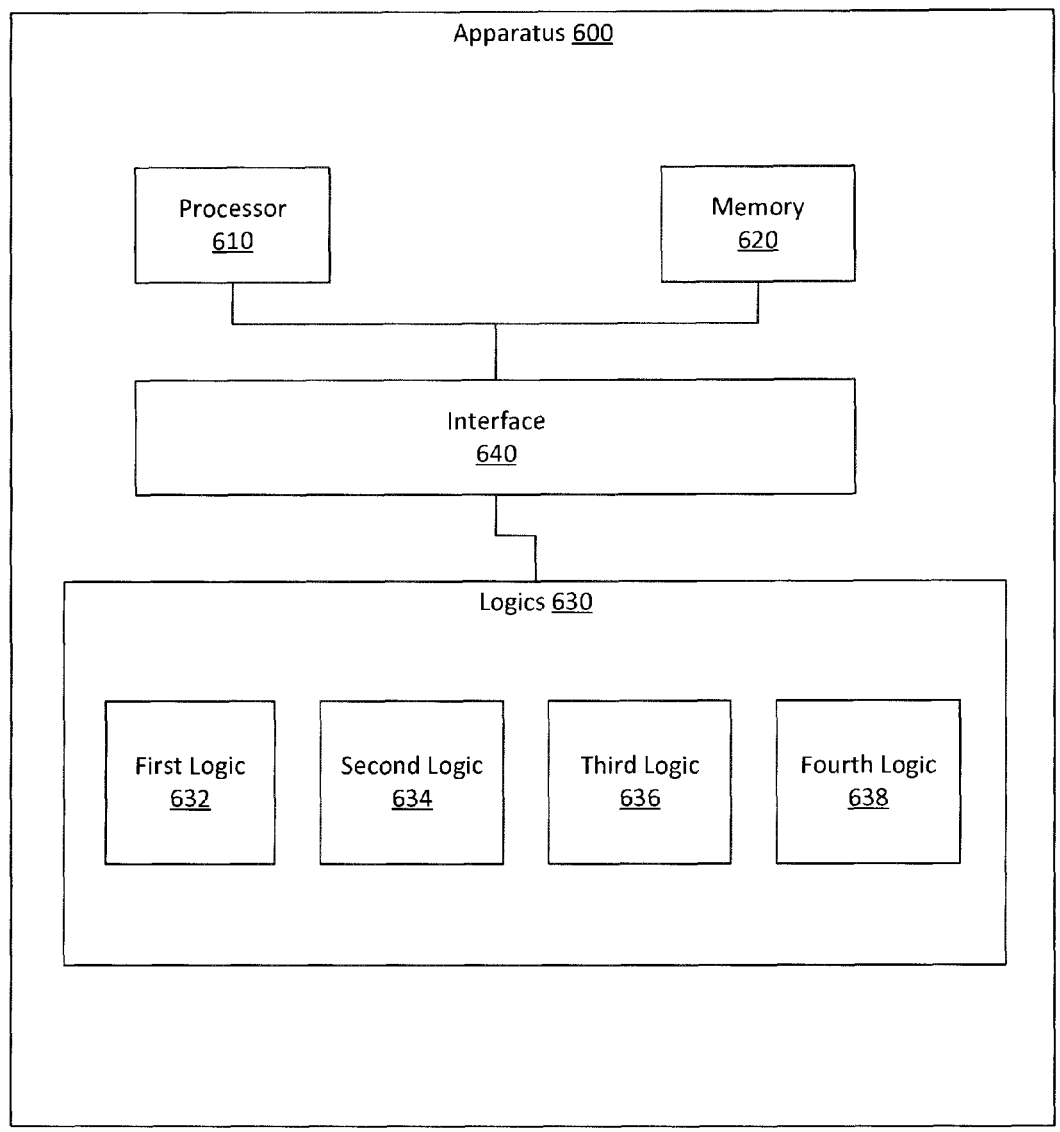
FIG. 6 illustrates an example apparatus associated with providing a recommendation system with a multi-dimensional discovery experience.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. Fourth logic 638 may display a representation of elements of the navigable data set. The representation may support the interactive recommendation experience for the user by providing a virtual space (e.g., surface, volume) where a user may "look around" for items, move towards or away from items, interact with other users who are looking at similar items, and other actions.

In one embodiment, the fourth logic 638 displays the representation as a traversable surface. The traversable surface may appear as, for example, a store, a flea market, a bazaar, a library, or other location where information about items may be displayed and in which a user may navigate (e.g., walk, look, reach, touch).

In one embodiment, the fourth logic 638 selectively exposes to a first user of the navigable data set information concerning a second user that is navigating the navigable data set within a threshold distance of the first user. The threshold distance may be measured using, for example, cosine similarity or other distance metrics. Exposing the first user may include providing, for example, an identifier (e.g., name, screen name) of the first user, an avatar associated with the first user, a shopping list prepared by the first user, or other information.

A user may have their shopping experience interrupted, or may want to come back to a certain location so that another person (e.g., spouse, co-worker) may look at the item with the user. Thus, in one embodiment, the fourth logic 638 places a virtual marker on the traversable surface in response to a bookmarking action of the user. The bookmarking action may be, for example, a user planting a virtual flag on a landscape, a user making a note about the location, or other action.

In one embodiment, the fourth logic 638 displays an embedded advertisement on the traversable surface. The advertisement may have been embedded in the latent space by inserting a vector for the advertisement into the latent space.

In one embodiment, the fourth logic 638 may provide a recommendation of an item based, at least in part, on a location at which the user is positioned or on a direction in which the user is navigating. For example, if a user is looking at a first type of fly-fishing rod, fourth logic 638 may provide a recommendation about a second, different type of fly-fishing rod located nearby. However, if the user has just navigated away from the second type of rod, the fourth logic 638 may not recommend the rod that was just viewed, but may instead recommend a third type of rod that is more like the first rod and less like the second rod. Thus, a recommendation may be made based not just on where a user is, but where a user has been or where a user is headed. In this embodiment, the fourth logic 638 may update a recommendation based, at least in part, on a current intent of the user as discerned from navigation by the user in the navigable data set. In one embodiment, an initial concept of the user's current intent may be provided by an initial query posed by the user. For example, a user may begin their shopping experience by identifying a general class of items they wish to view (e.g., sporting goods), by identifying a more specific class of items they wish to view (e.g., fly-fishing equipment) or even by identifying a specific item (e.g., GR30 Fly Rod).

Figure 7:
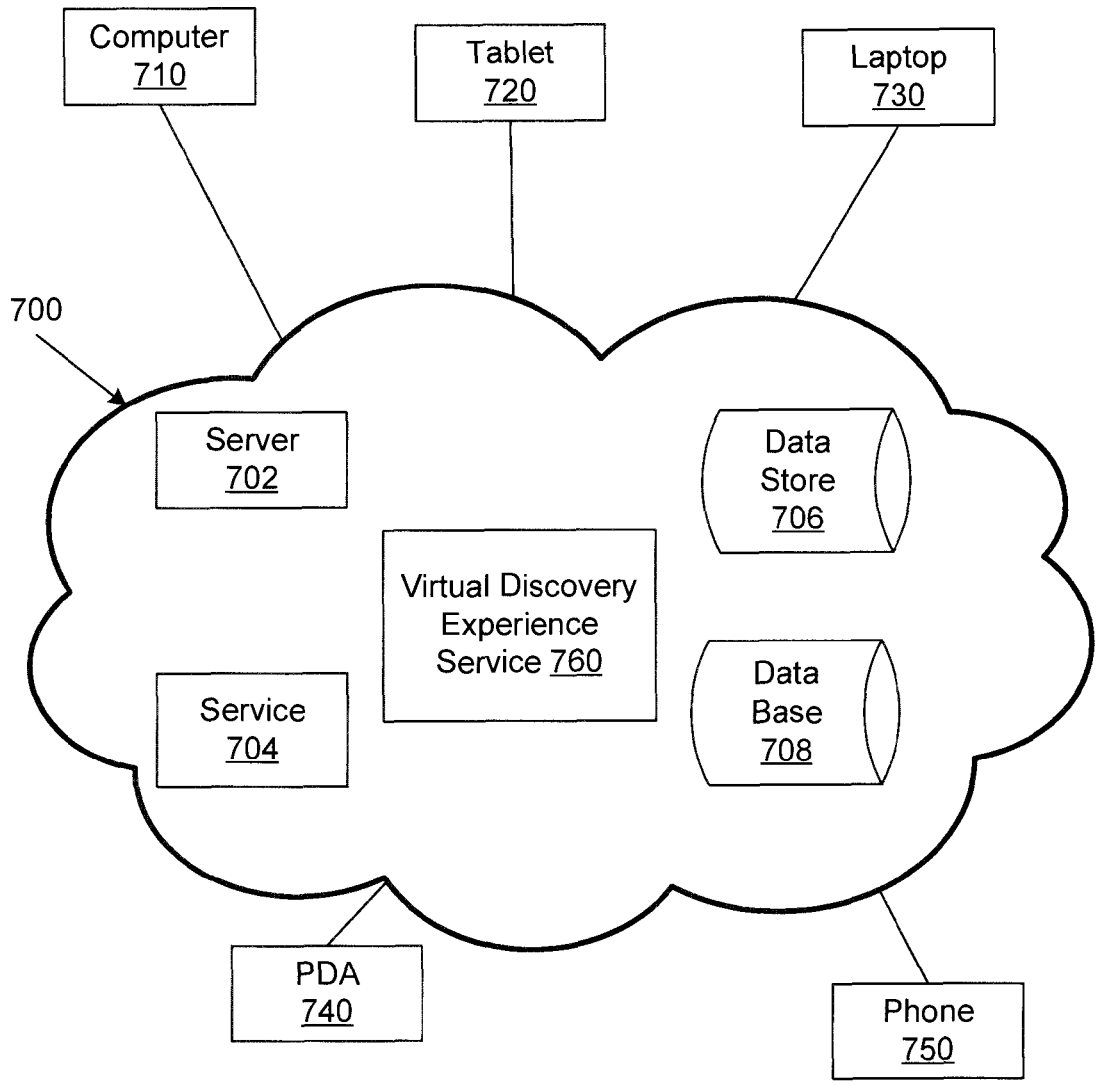
FIG. 7 illustrates an example cloud operating environment in which a recommendation system that provides a multi-dimensional discovery experience may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example virtual discovery experience service 760 residing in the cloud. The virtual discovery experience service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the virtual discovery experience service 760.

FIG. 7 illustrates various devices accessing the virtual discovery experience service 760 in the cloud. The devices include a computer 710, a tablet 720, a laptop computer 730, a personal digital assistant 740, and a mobile device (e.g., cellular phone, satellite phone, wearable computing device) 750. The virtual discovery experience service 760 may produce a recommendation for a user concerning a potential acquisition (e.g., purchase, rental, borrowing). The virtual discovery experience service 760 may produce data from which the recommendation may be made. The data may be produced by performing matrix factorization on a usage matrix that embeds users, items, and features, by producing distance data for the usage matrix, by performing multi-dimensional scaling that minimizes the strain on distances, and then producing a multi-dimensional vector-based navigable data set.

It is possible that different users at different locations using different devices may access the virtual discovery experience service 760 through different networks or interfaces. In one example, the virtual discovery experience service 760 may be accessed by a mobile device 750. In another example, portions of virtual discovery experience service 760 may reside on a mobile device 750.

Figure 8:
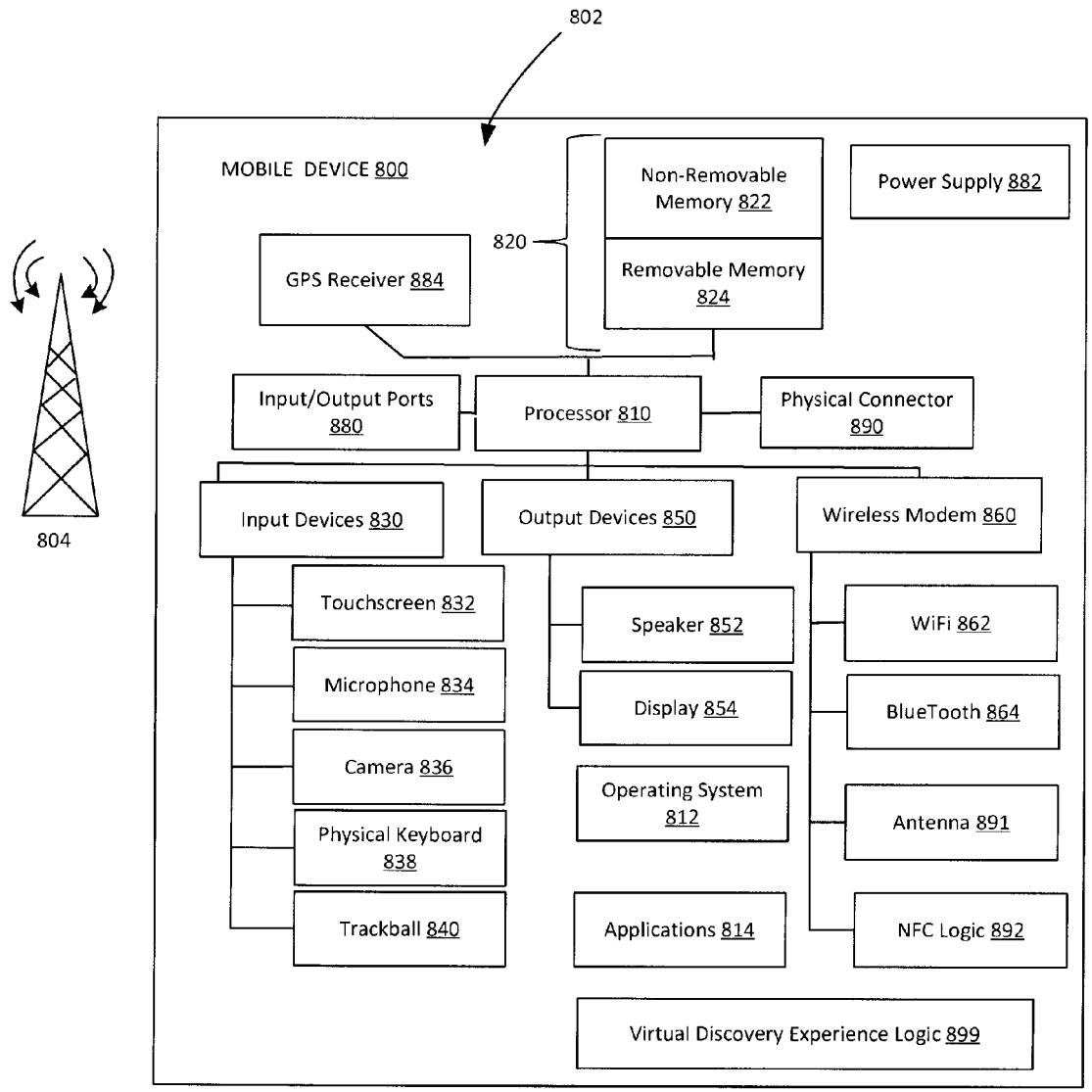
FIG. 8 is a system diagram depicting an exemplary mobile communication device that participates in a recommendation system that provides a multi-dimensional discovery experience.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), wearable computing device, etc.) and may allow wireless two-way communications with one or more mobile communications networks 804, such as a cellular or satellite network.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include recommendation applications, user activity applications, matrix factorization applications, distance extraction applications, multi-dimensional scaling applications, virtual landscape navigation applications, mobile computing applications (e.g., email applications, calendars, contact managers, web browsers, messaging applications), video games, or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include user vectors, item vectors, latent space data, recommendations, sales analytics data, like data, feature data, other shopper data, or other data. The memory 820 can be used to store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting gestures to provide input to a recommendation application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). NFC logic 892 facilitates having near field communications (NFC).

The mobile device 800 may include at least one input/output port 880, a power supply 882, a satellite navigation system receiver 884, such as a Global Positioning System (GPS) receiver, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include virtual discovery experience logic 899 that provides a functionality for the mobile device 800. For example, virtual discovery experience logic 899 may provide a client for interacting with a service (e.g., service 760, FIG. 7). Portions of the example methods described herein may be performed by virtual discovery experience logic 899. Similarly, virtual discovery experience logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store electronic data. A data store may be, for example, a database, a table, a file, a list, a queue, a heap, a memory, a register, and other physical repository. In different examples, a data store may reside in one logical or physical entity or may be distributed between two or more logical or physical entities. Storing electronic data in a data store causes a physical transformation of the data store.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one of, A, B, and C" is employed herein, (e.g., a data store configured to store one of, A, B, and C) it is intended to convey the set of possibilities A, B, and C, (e.g., the data store may store only A, only B, or only C). It is not intended to require one of A, one of B, and one of C. When the applicants intend to indicate "at least one of A, at least one of B, and at least one of C", then the phrasing "at least one of A, at least one of B, and at least one of C" will be employed.

To the extent that the phrase "one or more of, A, B, and C" is employed herein, (e.g., a data store configured to store one or more of, A, B, and C) it is intended to convey the set of possibilities A, B, C, AB, AC, BC, ABC, AA . . . A, BB . . . B, CC . . . C, AA . . . ABB . . . B, AA . . . ACC . . . C, BB . . . BCC . . . C, or AA . . . ABB . . . BCC . . . C (e.g., the data store may store only A, only B, only C, A&B, A&C, B&C, A&B&C, or other combinations thereof including multiple instances of A, B, or C). It is not intended to require one of A, one of B, and one of C. When the applicants intend to indicate "at least one of A, at least one of B, and at least one of C", then the phrasing "at least one of A, at least one of B, and at least one of C" will be employed.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a processor;
a memory that stores data associated with making a recommendation to a user of an item to acquire;
a set of logics that produce a navigable data set that supports an interactive recommendation experience for the user; and
an interface to connect the processor, the memory, and the set of logics;
the set of logics comprising:
a first logic that accesses a Q-dimensional latent space that embeds users and items;
a second logic that extracts a full distance matrix from the Q-dimensional latent space; and a third logic that produces a plurality of vectors associated with a P-dimensional Euclidean space from the full distance matrix, where the navigable data set is based, at least in part, on the plurality of vectors, P being less than or equal to Q.

2. The apparatus of claim 1, where Q is at least twenty, and where the Q-dimensional latent space embeds users, items, and features.

3. The apparatus of claim 1, where P is three.

4. The apparatus of claim 2, where the first logic creates the Q-dimensional latent space by performing matrix factorization on collaborative filtering data.

5. The apparatus of claim 4, where the first logic embeds an advertisement in the Q-dimensional latent space at a location determined by proximity to a relevant item, by proximity to a relevant feature, by proximity to a popular item, or by proximity to a popular feature.

6. The apparatus of claim 2, where the second logic extracts the full distance matrix from the Q-dimensional latent space by defining a distance metric between item pairs in the latent space and by populating the full distance matrix using values computed for item pairs using the distance metric.

7. The apparatus of claim 6, where the distance metric is:

$$dis(i, j) = \text{angle}(i, j) = \cos^{-1}\left(\frac{v_i^T v_j}{\|v_i\|\|v_j\|}\right)$$

where $v_i$ is a vector representing item i in the latent space, $v_j$ is a vector representing item j in the latent space, and where the full distance matrix is represented by:

$$D = \begin{pmatrix} dis(1,1) & \cdots & dis(1,N) \\ \vdots & \ddots & \vdots \\ dis(N,1) & \cdots & dis(N,N) \end{pmatrix}$$

N being the number of items in the matrix.

8. The apparatus of claim 6, where the distance metric is:

$$dis(i,j) = 1 - \cos(\text{angle}(i,j))$$

where i is an item in the latent space, where j is an item represented in the latent space, and where the full distance matrix is represented by:

$$D = \begin{pmatrix} dis(1,1) & \cdots & dis(1,N) \\ \vdots & \ddots & \vdots \\ dis(N,1) & \cdots & dis(N,N) \end{pmatrix}$$

N being the number of items in the matrix.

9. The apparatus of claim 2, where the third logic produces the plurality of vectors in a manner that minimizes strain on the distances between members of the plurality of vectors.

10. The apparatus of claim 9, where minimizing the strain on the distances between members of the plurality of vectors involves minimizing squared loss as represented by:

$$\min_{x_1, x_2 \ldots x_N} (d_{ij} - \|x_i - x_j\|)^2,$$

where $d_{ij}$ is the (i,j)'th entry in the distance matrix D.

11. The apparatus of claim 10, where minimizing squared loss comprises:
defining a matrix A with components $$a_{ij} = -\frac{1}{2}d_{i,j}^2,$$

where $d_{i,j}^2$ is the squared distance between item i and item j, centering A using a centering matrix $$H = I - \frac{1}{n}1$$

1 to produce B=HAH,
decomposing B using: $B = V\Lambda V^T$, where V are the eigenvectors and $\Lambda$ is a diagonal eigenvalues matrix, and establishing new coordinates in a lower dimensional space using a matrix X according to:

$$X = V\Lambda^{\frac{1}{2}}.$$

12. The apparatus of claim 11, where the third logic produces a member of the plurality of vectors using the first n components of a vector in X.

13. The apparatus of claim 12, n being three.

14. The apparatus of claim 2, comprising a fourth logic that displays a representation of elements of the navigable data set, where the representation supports the interactive recommendation experience for the user.

15. The apparatus of claim 14, where the fourth logic exposes to a first user of the navigable data set information concerning a second user that is navigating the navigable data set within a threshold distance of the first user.

16. The apparatus of claim 14, where the fourth logic displays the representation as a traversable surface.

17. The apparatus of claim 16, where the fourth logic places a virtual marker on the traversable surface in response to a bookmarking action of the user.

18. The apparatus of claim 16, where the fourth logic displays an embedded advertisement on the traversable surface.

19. The apparatus of claim 14, where the fourth logic provides a recommendation of an item based, at least in part, on a location at which the user is positioned or on a direction in which the user is navigating.

20. The apparatus of claim 19, where the fourth logic updates the recommendation based, at least in part, on a current intent of the user as discerned from navigation by the user in the navigable data set.

21. The apparatus of claim 1, where P is three and Q is three.

22. A method, comprising:
producing a first electronic data set associated with a multi-dimensional latent space that embeds items, users, and features, where the latent space is produced by performing matrix factorization on collaborative filter data;

producing a second electronic data set from the first electronic data set, where the second electronic data set stores distances between pairs of items represented in the latent space;

producing a third electronic data set from the second electronic data set, where the third electronic data set stores vectors that represent items for which distances are stored in the second electronic data set, where the vectors are produced to minimize strain on the distances;

displaying a multi-dimensional visual representation of an item landscape, where items are positioned on the item landscape based, at least in part, on the vectors;

detecting a navigation action from a viewer of the multi-dimensional visual representation, and making a recommendation of an item to the viewer based, at least in part, on the navigation action.

23. The method of claim 22, comprising placing a viewable advertisement on the item landscape, where the advertisement is placed at a location determined by a relationship between the advertisement and an item embedded in the latent space.

24. The method of claim 23, comprising:
upon identifying one or more other viewers that are viewing items on the item landscape within a threshold distance of the viewer:
selectively exposing information concerning the viewer to the one or more other viewers;
selectively exposing information concerning the one or more other viewers to the viewer, or
selectively establishing a communication between the viewer and the one or more other viewers.

25. The method of claim 24, where producing the second electronic data includes extracting a full distance matrix D from the multi-dimensional latent space by defining a distance metric between item pairs in the latent space and by populating the full distance matrix with values computed using the distance metric, and
where producing the third electronic data includes minimizing the strain on the distances between vectors, where minimizing the strain involves minimizing squared loss as represented by:

$$\min_{x_1, x_2 \cdots x_N} (d_{ij} - \|x_i - x_j\|)^2,$$

where $d_{ij}$ is the (i,j)'th entry in the distance matrix D.

26. A computer-readable storage medium storing computer-executable instructions that when executed by a computer control the computer to perform a method, the method comprising:
producing a first electronic data set associated with a multi-dimensional latent space that embeds items, users, and features, where the latent space is produced by performing matrix factorization on collaborative filter data;

producing a second electronic data set from the first electronic data set, where the second electronic data set stores distances between pairs of items represented in the latent space, where producing the second electronic data includes extracting a full distance matrix D from the multi-dimensional latent space by defining a distance metric between item pairs in the latent space and by populating the full distance matrix with values computed using the distance metric, where the distance metric is $$dis(i, j) = \text{angle}(i, j) = \cos^{-1}\left(\frac{v_i^T v_j}{\|v_i\|\|v_j\|}\right)$$

or dis(i,j)=1−cos(angle(i, j)))
where $v_i$ is a vector representing item i in the latent space, $v_j$ is a vector representing item j in the latent space, and where the full distance matrix is represented by:

$$D = \begin{pmatrix} dis(1,1) & \cdots & dis(1,N) \\ \vdots & \ddots & \vdots \\ dis(N,1) & \cdots & dis(N,N) \end{pmatrix}$$

N being the number of items in the matrix;

producing a third electronic data set from the second electronic data set, where the third electronic data set stores vectors that represent items for which distances are stored in the second electronic data set, where the vectors are produced to minimize strain on the distances, where minimizing strain involves minimizing squared loss as represented by:

$$\min_{x_1, x_2 \cdots x_N} (d_{ij} - \|x_i - x_j\|)^2,$$

where $d_{ij}$ is the (i,j)'th entry in the distance matrix D, where minimizing squared loss comprises:
defining a matrix A with components $$a_{ij} = -\frac{1}{2} d_{i,j}^2,$$

where $d_{i,j}^2$ is the squared distance between item i and item j, centering A using a centering matrix $$H = I - \frac{1}{n}\mathbf{1}$$

to produce B=HAH,
decomposing B using: $B = V\Lambda V^T$, where V are the eigenvectors and $\Lambda$ is a diagonal eigenvalues matrix, and
establishing new coordinates in a lower dimensional space using a matrix X according to:

$$X = V\Lambda^{\frac{1}{2}};$$

displaying a multi-dimensional visual representation of an item landscape, where items are positioned on the item landscape based, at least in part, on the vectors;

placing a viewable advertisement on the item landscape, where the advertisement is placed at a location determined by a relationship between the advertisement and an item embedded in the latent space;

receiving a navigation action from a viewer of the three dimensional visual representation;

making a recommendation of an item to the viewer based, at least in part, on the navigation action, and upon identifying one or more other viewers that are viewing items on the item landscape within a threshold distance of the viewer:
  selectively exposing information concerning the viewer to the one or more other viewers;
  selectively exposing information concerning the one or more other viewers to the viewer, or
  selectively establishing a communication between the viewer and the one or more other viewers.

* * * * *